(12) United States Patent
Oho et al.

(10) Patent No.: US 10,503,139 B2
(45) Date of Patent: Dec. 10, 2019

(54) CONTROL DEVICE FOR MACHINE TOOL PERFORMING OSCILLATION CUTTING

(71) Applicant: FANUC CORPORATION, Yamanashi (JP)

(72) Inventors: Yusaku Oho, Yamanashi (JP); Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 61 days.

(21) Appl. No.: 15/952,265

(22) Filed: Apr. 13, 2018

(65) Prior Publication Data
US 2018/0307196 A1 Oct. 25, 2018

(30) Foreign Application Priority Data
Apr. 20, 2017 (JP) .................................. 2017-083919

(51) Int. Cl.
G05B 19/18 (2006.01)
(52) U.S. Cl.
CPC .. *G05B 19/182* (2013.01); *G05B 2219/31263* (2013.01); *G05B 2219/37372* (2013.01); *G05B 2219/45044* (2013.01)

(58) Field of Classification Search
CPC ........ G05B 19/182; G05B 2219/45044; G05B 2219/37372
See application file for complete search history.

(56) References Cited

FOREIGN PATENT DOCUMENTS

| | | |
|---|---|---|
| JP | 2006-172149 A | 6/2006 |
| JP | 5033929 B1 | 9/2012 |
| JP | 5139592 B1 | 2/2013 |
| JP | 5599523 B1 | 10/2014 |
| JP | 2017-56515 A | 3/2017 |
| JP | 2018-41275 A | 3/2018 |
| WO | 2016/047485 A1 | 3/2016 |

*Primary Examiner* — Vincent H Tran
(74) *Attorney, Agent, or Firm* — Hauptman Ham, LLP

(57) ABSTRACT

A control device for a machine tool includes an oscillation command generation part which generates an oscillation command for a fees axis, a first adding part which adds an oscillation command to a position deviation between a position command and the detected position of the fees axis to generate a resultant command, a normalization part for normalizing the resultant command, a learning control part that obtains a correction amount of the resultant command based on an oscillation phase obtained from the oscillation command and a normalized resultant command and which adds the correction amount to the resultant command, a denormalization part which denormalizes an output from the learning control part, and a second adding part for adding a denormalized output from the denormalization part to the resultant command.

8 Claims, 7 Drawing Sheets

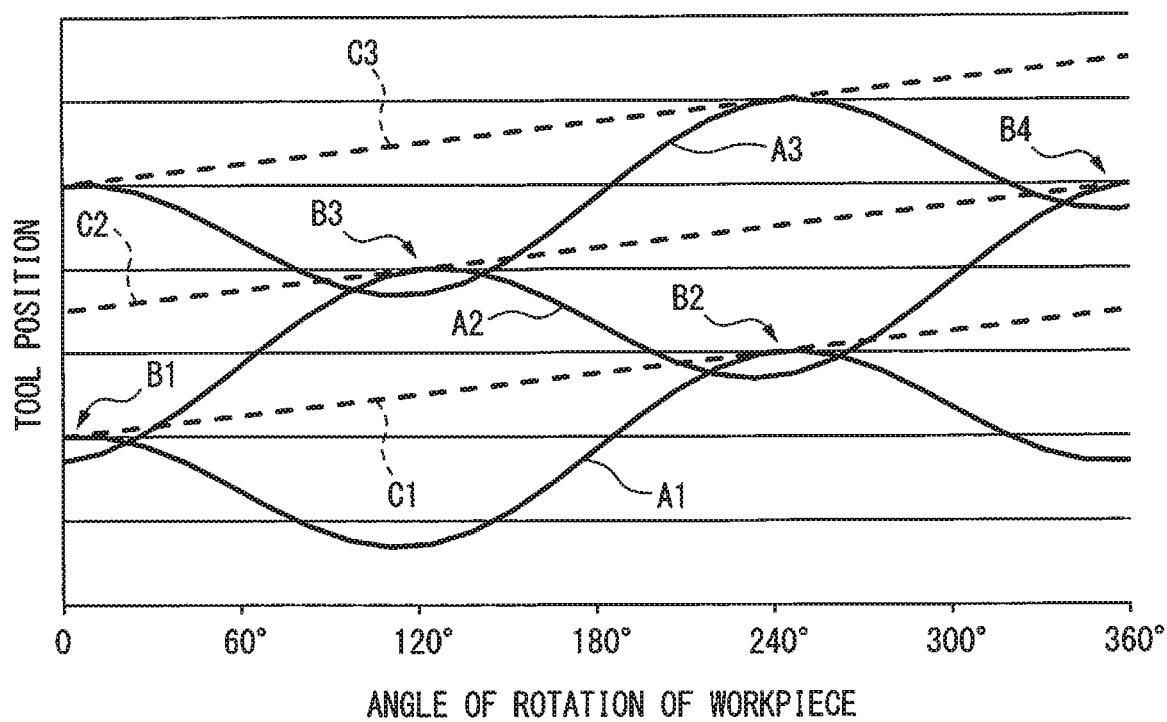

CONTROL DEVICE FOR MACHINE TOOL PERFORMING OSCILLATION CUTTING

RELATED APPLICATIONS

The present application claims priority to Japanese Patent Application No. 2017-083919 filed on Apr. 20, 2017, the disclosure of which is hereby incorporated by reference herein in its entirety.

1. FIELD OF THE INVENTION

The present invention relates to a control device for a machine tool performing oscillation cutting.

2. DESCRIPTION OF THE RELATED ART

When swarf is continuously generated during the machining of a workpiece using the cutting tool of a machine tool, the swarf may become entangled with the cutting tool. Thus, a technology of oscillating the tool so as to intermittently cut the workpiece is known (refer to, for example, Japanese Patent No. 5033929 or Japanese Patent No. 5139592).

However, Japanese Patent No. 5033929 and Japanese Patent No. 5139592 do not take the termination of cutting at a predetermined machining end position into account. Therefore, a problem occurs in that the cutting tool continues to oscillate and exceeds the predetermined machining end position. In connection thereto, W/O 2016/047485 discloses "When the cutting tool reaches a predetermined cutting tool machining stop position on a workpiece in the machining feeding direction, the amplitude control means reduces the amplitude of reciprocal oscillation by the oscillation means in accordance with a feeding operation in the machining feeding direction."

SUMMARY OF THE INVENTION

However, when learning control is applied to intermittent cutting, even if the amplitude of the oscillating motion is decreased near the machining stop position, the amplitude does not immediately comply and diminish. Therefore, the problem that the cutting tool exceeds the machining stop position may not be solved in some cases. Furthermore, depending on the shape of workpiece, there is a risk that a cut may occur in the workpiece near the machining stop position.

Thus, a control device for a machine tool that can improve compliance even when learning control is applied is desired.

According to a first aspect of the present disclosure, a control device for controlling a machine tool, the machine tool comprising a spindle for relatively rotating a workpiece and a tool around a center axis of the workpiece, and at least one fees axis for relatively feeding the tool or the workpiece along a generatrix of an outer peripheral surface or an inner peripheral surface of the workpiece, the control device comprising a position command generation part for generating a position command for the at least one fees axis based on a relative rotation speed of the workpiece and the tool and a relative feed speed of the tool and the workpiece, an oscillation command generation part that generates an oscillation command for the at least one fees axis based on the rotation speed and the position command such that the tool intermittently cuts the workpiece at an oscillation frequency which is a positive non-integral multiple of the rotation speed, a first adding part for generating a resultant command obtained by adding the oscillation command to a position deviation, which is a difference between the position command an actual position of the at least one fees axis, a normalization part for normalizing the resultant command, a learning control part that obtains a correction amount of the resultant command based on an oscillation phase obtained from the oscillation command and a normalized resultant command and which adds the correction amount to the resultant command, a denormalization part for denormalizing an output from the learning control part, and a second adding part for adding an output which has been denormalized by the denormalization part to the resultant command is provided.

In the first aspect, the resultant command is normalized using a representative value, for example, the position command, is input into the learning control part, and the output from the learning control part is denormalized using a representative value, for example, the position command. Thus, even when the representative value at the time of inputting to the learning control part is different from the representative value at the time of outputting, since the resultant command is denormalized using the representative value at the time of output, the change in the representative value, for example, the position command, can easily be complied with. Therefore, even when learning control is applied, compliance can be improved.

The objects, features and advantages of the present invention, as well as other objects, features and advantages will be further clarified from the detailed description of the representative embodiments of the present disclosure as shown in the accompanying drawings.

BRIEF DESCRIPTION OF THE DRAWINGS

FIG. 5 is a drawing showing the relationship between feed amount and rotation angle.

DETAILED DESCRIPTION

Figure 1:
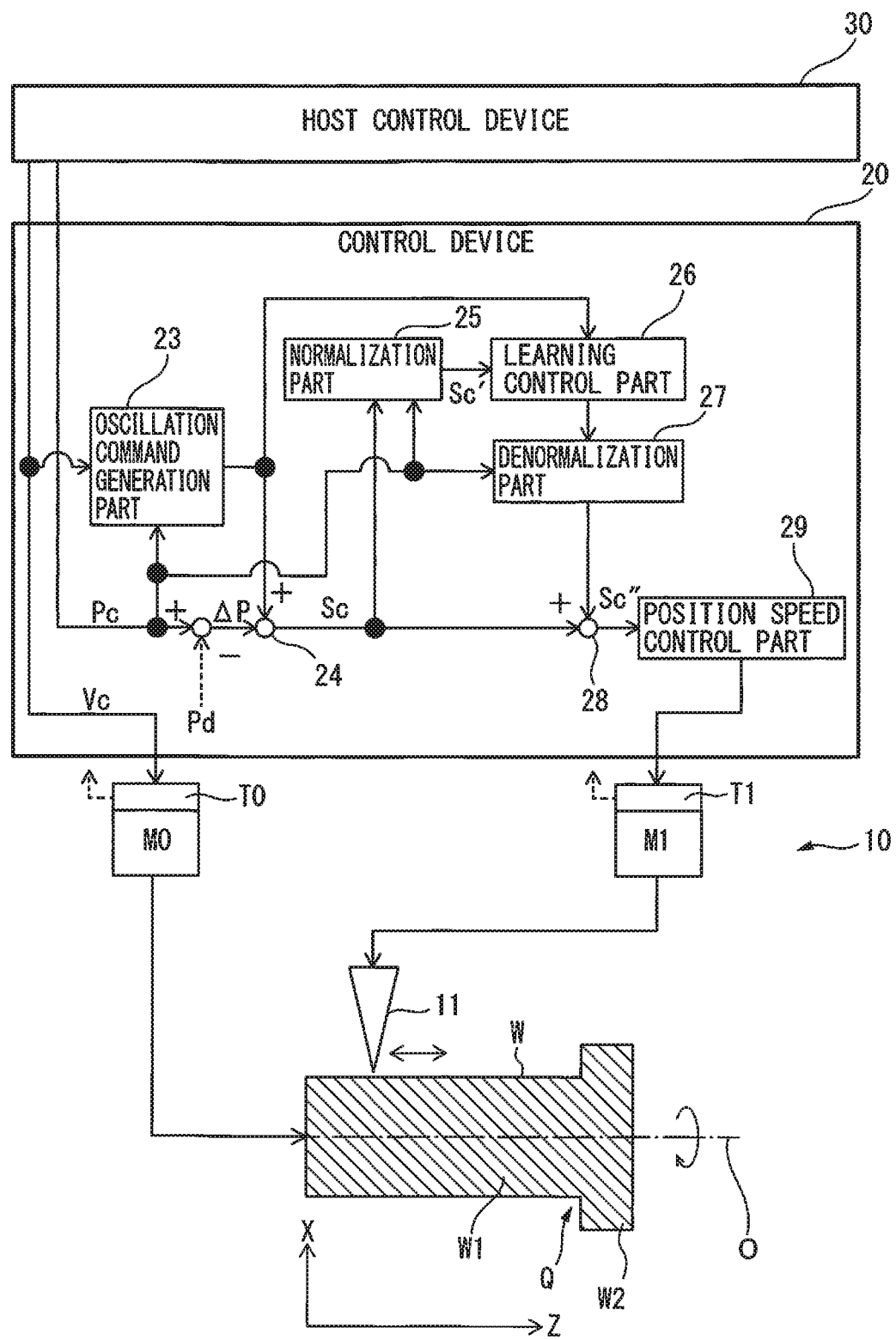
FIG. 1 is a drawing of a system including a control device according to a first embodiment.

The embodiments of the present invention will be described below with reference to the accompanying drawings. In the drawings below, the same components are given the same reference numerals. For the ease of understanding, the drawings have been modified in scale. Further, the embodiments shown in the drawings are only examples for carrying out the present invention, and the present invention is not limited to the illustrated embodiments.

FIG. 1 is a drawing of a system including a control device according to a first embodiment. As shown in FIG. 1, the system 1 includes a machine tool 10, a control device 20 for controlling the machine tool 10, and a host control device 30 connected to the control device 20. The machine tool 10 includes a tool 11, and the tool 11 cuts the outer peripheral surface or the inner peripheral surface of a workpiece W, which is at least partially rotationally symmetrical about the axis of rotation O. Furthermore, in FIG. 1, etc., the axis of rotation of the workpiece W is designated as the Z axis, and the axis perpendicular to the Z axis is designated as the X axis.

The spindle M0 of the machine tool 10 rotates the workpiece W around the axis of rotation O thereof. Further, the fees axis M1 of the machine tool 10 moves the tool 11 along the generatrix of the workpiece W. Note that, as will be described later, two or more feed axes M1 and M2 may move the tool 11 along the generatrix of the workpiece W.

The spindle M0 includes a spindle rotation mechanism and a servo motor to drive the rotation mechanism. Similarly, the feed axes M1 and M2 include feeding mechanisms for the tool 11 and servo motors to drive the feeding mechanisms. The feed axes M1 and M2 cooperate with the spindle M0 to feed the tool 11 and cut the workpiece W. Note that though the required torque for the spindle M0 and the feed axes M1 and M2 can be estimated, excluding the cutting load, from inertia and the angular acceleration of the command, position detection parts T0, T1 and T2 for detecting the positions and torques of the spindle M0 and the feed axes M1 and M2 may be provided. The position detection parts T0, T1 and T2 may be encoders.

The host control device 30 may be, for example, a PNC (programmable logic controller), but the host control device 30 is not limited thereto. The host control device 30 generates the machining conditions of the workpiece W, such as the rotation speed of the spindle M0 which rotates the workpiece W, e.g., a rotation speed command Vc, and a position command Pc of the feed axes M1 and M2 which feed the tool 11. In other words, the host control device 30 functions as a position command generation part for generating the position command of at least one of the feed axes M1 and M2 based on the relative rotation speed between the workpiece W and the tool 11 and the relative feed speed between the tool 11 and the workpiece W. Since the position command Pc is the position command per unit time, the position command Pc may be considered a type of speed command. The detected value of the rotation speed may be used as the rotation speed of the spindle M0. Below, the rotation speed of the spindle M0 is used as the rotation speed command Vc.

The control device 20 is a digital computer including a CPU, a memory, and the like, but the control device 20 is not limited thereto. The control device 20 includes an oscillation command generation part 23 which generates an oscillation command for at least one of the feed axes M1 and M2 based on the rotation speed of the spindle M0 and the position command Pc of at least one of the feed axes M1 and M2 so that the oscillation command becomes a positive non-integral multiple of the rotation speed and the tool 11 intermittently cuts the workpiece W. The oscillation command includes the oscillation frequency and the oscillation amplitude. The rotation speed command Vc of the spindle M0 or the actual rotation speed value thereof may be used as the rotation speed.

Note that, intermittent cutting means that the tool 11 cuts the workpiece W while periodically contacting with and separating from the workpiece W, which is also referred to as oscillation cutting or vibration cutting. Furthermore, the workpiece W in FIG. 1 rotates and the tool 11 oscillates with respect to the workpiece W. However, a configuration in which the tool 11 rotates and the workpiece W oscillates with respect to the tool 11 may be used.

The control device 20 includes a first adding part 24 which generates a resultant command Sc which is obtained by adding the oscillation command to a position deviation $\Delta P$, which is the difference between the position command Pc and a detected position Pd (actual position) of at least one of the feed axes M1 and M2 detected by the position detecting parts T1 and T2. Further, the control device 20 includes a normalization part 25 which normalizes the resultant command Sc, which is the position deviation $\Delta P$ to which the oscillation command has been added, and a learning control part 26 which obtains a correction amount for the resultant command Sc based on the oscillation phase obtained from the oscillation command and a normalized resultant command Sc' and adds the correction amount to the resulutant command Sc.

The learning control part 26 repeatedly calculates the correction amount based on the oscillation phase obtained from the oscillation command and the normalized resultant command and corrects the resultant command to improve compliance with the periodic operation. Learning control is a control that improves compliance with the periodic command by correcting the movement command by integrating the deviation up to the prior learning period.

Further, the control device 20 includes a denormalization part 27 which denormalizes the output from the learning control part 26, and a second adding part 28 which adds the denormalized output from the denormalization part 27 to the resultant command Sc. Further, the control device 20 includes a position speed control part 29 which generates a speed command and a torque command for the feed axes M1 and M2 based on the resultant command Sc" to which the denormalized output has been added, and outputs the speed command and torque command to the feed axes M1 and M2. The CPU of the control device 20 may fulfill the functions of the oscillation command generation part 23, the first adding part 24, the normalization part 25, the learning control part 26, the denormalization part 27, the second adding part 28 and the position speed control part 29.

FIGS. 2A through 2D are cross-sectional views of first to fourth workpieces. The workpiece W shown in 2A includes a cylindrical portion W1 and a flange W2 coupled to the cylindrical portion W1. A corner part Q having a substantially perpendicular cross-section is formed between the cylindrical portion W1 and the flange W2. In contrast thereto, in the workpiece W shown in FIG. 2B, the cross-section of the corner part Q between the cylindrical part W1 and the flange W2 is arcuate.

Figure 2A:
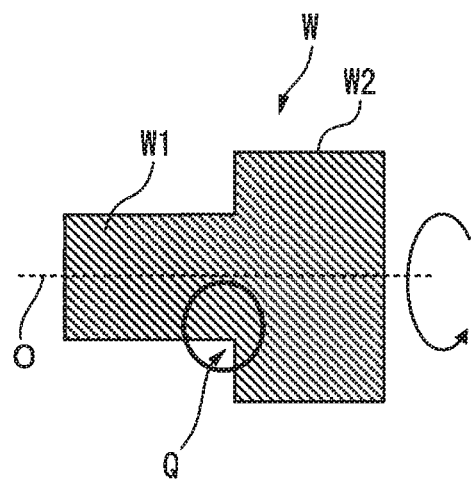
FIG. 2A is a cross-sectional view of a first workpiece.
Figure 2B:
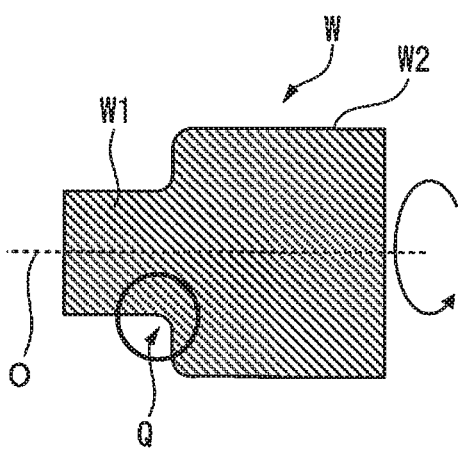
FIG. 2B is a cross-sectional view of a second workpiece.
Figure 2C:
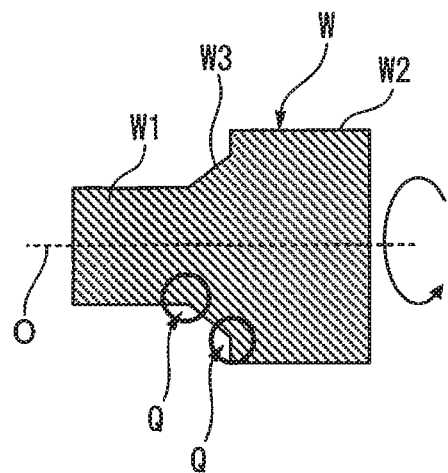
FIG. 2C is a cross-sectional view of a third workpiece.
Figure 2D:
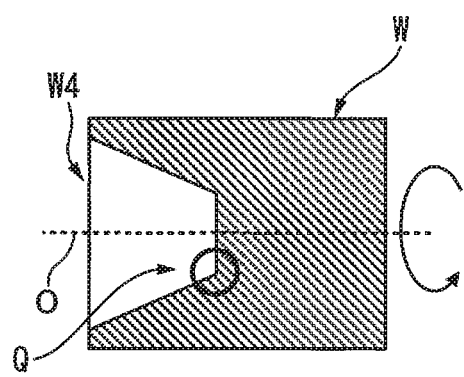
FIG. 2D is a cross-sectional view of a fourth workpiece.

Further, the workpiece W shown in FIG. 2C includes a cylindrical portion W1, a flange W2, and a tapered portion W3 arranged between the cylindrical portion W1 and the flange W2. Corner parts Q having obtuse cross-sections are formed between the cylindrical portion W1 and the tapered portion W3, and between the tapered portion W3 and the flange W2. Furthermore, the workpiece W shown in FIG. 2D is cylindrical, and a truncated cone-shaped recess W4 is formed on an end surface thereof. A corner part Q having an obtuse cross-section is formed between the bottom of the recess W4 and the inner peripheral surface.

The cylindrical portions W1, tapered portion W3 and truncated cone-shaped recess W4 of the workpieces W shown in FIGS. 2A to 2D are rotationally symmetrical about the axis of rotation O. In other words, the workpieces W shown in FIGS. 2A to 2D include a portion which is rotationally symmetrical about the axis of rotation O.

The corner parts Q of the workpieces W are radially inward of the radially outermost part of the workpiece W in the cross-section along the axis of rotation O, and these corner parts Q are not continuous with the radially outermost part. In other words, the workpiece W includes a stepped part in the cross-section along the axis of rotation O.

The tool 11 shown in FIG. 1 can cut the outer peripheral surface of the cylindrical portion W1 or tapered portion W3 shown in FIGS. 2A to 2C or the inner peripheral surface of the truncated cone-shaped recess W4 shown in FIG. 2D. Note that it is not necessary that the flange W2 be rotationally symmetrical, but a projection which simply extends in the radial direction may be provided in place of the flange W2. Furthermore, a tapered portion may be provided in place of the cylindrical portion W1.

Figure 3:
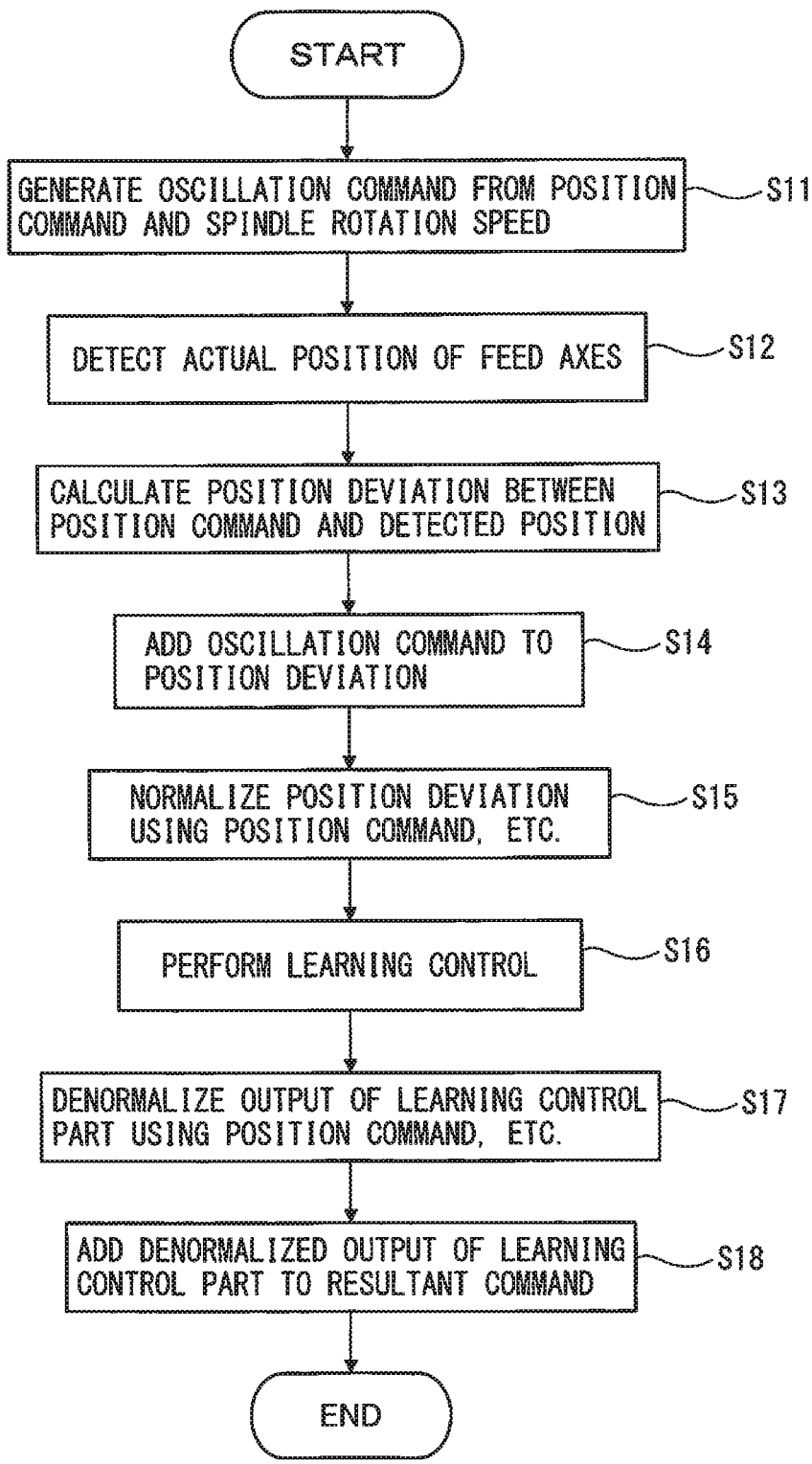
FIG. 3 is a flowchart showing the operations of a control device according to a representative embodiment.

FIG. 3 is a flow chart showing the operations of the control device according to a representative embodiment. For the ease of understanding, a case where the tool 11 cuts the outer peripheral surface of only the cylindrical portion W1 of the workpiece W will be explained. The process shown in FIG. 3 is repeatedly performed every predetermined control cycle.

Figure 4:
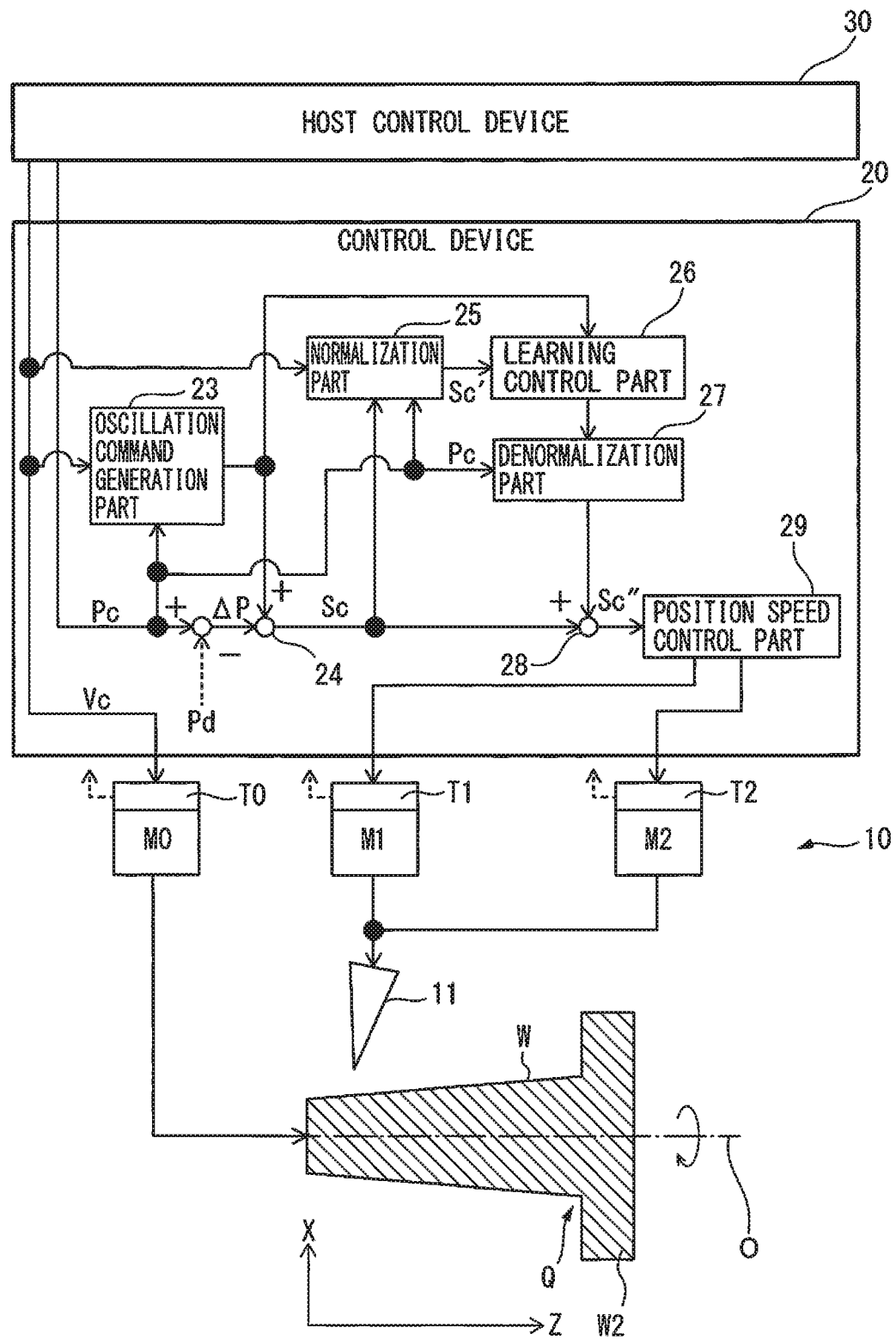
FIG. 4 is a drawing of a system including a control device according to a second embodiment.

First, in step S11 of FIG. 3, the oscillation command generation part 23 generates an oscillation command for the fees axis M1 based on the position command Pc and the spindle rotation speed command Vc provided from the host control device 30. In the example shown in FIG. 1, an oscillation command for only the fees axis M1 is generated, since the tool 11 oscillates only along a linear line parallel to the axis of rotation O. FIG. 4 is a drawing of another system including a control device according to a second embodiment. In the example shown in FIG. 4, the tapered portion W3 is coupled to the flange W2. In such a case, the tool 11 oscillates obliquely along the generatrix of the tapered portion W3 to cut the outer peripheral surface of the tapered portion W3. Since the tool 11 moves in a resultant direction of the X direction and the Z direction, in order to move the tool 11, two feed axes M1 and M2 are required. In such a case, in step S11, oscillation commands for the two feed axes M1 and M2 are generated. Note that a configuration in which the tool 11 is fed by more than two feed axes is included in the scope of the present invention. Furthermore, in such a case, it is assumed that the illustrated configuration is provided for each of the feed axes.

A case in which the tool 11 shown in FIG. 1 cuts the outer peripheral surface of only the cylindrical portion W1 of the workpiece W will be explained below. However, it can be understood that the explanation below substantially applies to the cases shown in FIGS. 2A to 2D and 4.

FIG. 5 is a drawing showing the relationship between feed amount and rotation angle. In FIG. 5, the horizontal axis represents the angle of rotation of the workpiece W, and the vertical axis represents the feed amount of the tool 11 in the center axis direction of the workpiece W (i.e., the Z axis direction). FIG. 5 shows a plurality of linear dashed lines C1, C2, C3 . . . which extend in the oblique direction. As can be understood from FIG. 5, the vertical axis coordinate of the point of intersection between the dashed line C1 and the vertical axis corresponds to the vertical axis coordinate of the start point of the next dashed line C2. Similarly, the vertical axis coordinate of the point of intersection between the dashed line C2 and the vertical axis corresponds to the vertical axis coordinate of the start point of the next dashed line C3. The plurality of linear dashed lines C1, C2, C3 . . . indicate the trajectory of the tool 11 on the workpiece W in the absence of an oscillation command. The curves A1, A2, A3 . . . shown in FIG. 5 indicate the trajectory of the tool 11 on the workpiece W in the presence of the oscillation command. In other words, the dashed lines C1, C2, C3, etc., indicate only the position commands before the oscillation commands are added thereto (the original command values), and the curves A1, A2, A3, etc., show the position commands after the oscillation commands have been added thereto (resultant commands). Therefore, the curves A1, A2 and A3 indicate commands obtained by adding the cosine wave-like oscillation commands to the respective position commands represented by the dashed lines C1, C2 and C3.

Furthermore, curve A1 is the trajectory of the tool 11 in the first rotation of workpiece W, curve A2 is the trajectory of tool 11 in the second rotation of workpiece W, and curve A3 is the trajectory of tool 11 in the third rotation of workpiece W. For the sake of simplicity, the trajectories of the tool 11 after the fourth rotation of the workpiece W are not shown. These curves A1, A2 and A3 are obtained by adding the feed amount in the vertical axis direction to the cosine waves using dashed lines C1, C2 and C3 as reference axes, and the curves A1, A2 and A3 have oscillation frequencies which are non-integral multiples of the rotational velocity (number of rotations) of the workpiece W.

In step S11 of FIG. 3, the oscillation command generation part 23 generates an oscillation command as follows. First, in the host control device 30, dashed lines C1, C2 and C3 of the position command Pc of the fees axis M1 are determined. The oscillation command generation part 23 determines the oscillation frequency of the cosine wave-like oscillation command in order to generate commands like the curves A1, A2, and A3 with the dashed lines C1, C2 and C3 as references axes. The value obtained from the expression S/60×I of Formula (1), which is described later, corresponds to the oscillation frequency.

When determining the above-described oscillation frequency, as shown in FIG. 5, it is preferable that the initial phase of the cosine wave-like curve A2 using a certain dashed line, for example, dashed line C2, as a reference axis deviate by a half cycle from the cosine wave-like curve A1 using the preceding dashed line, for example, dashed line C1, as the reference axis. The reason for this is that when the period deviates by a half-cycle, the oscillation amplitude of the oscillation command can be minimized, and as a result, swarf can be most efficiently shredded.

Then, the oscillation command generation part 23 determines the oscillation amplitude of the above-mentioned oscillation command in order to generate commands such as the curves A1, A2 and A3 using the dashed lines C1, C2 and C3 as reference axes. The value obtained from the expression K×F/2 in Formula (1), which will be described later, is the oscillation amplitude. Curve A1 and curve A2 shown in FIG. 5 overlap each other at portion B1, where the rotation angle is about 0 degrees, and portion B2, where the rotation angle is about 240 degrees. As can be seen from FIG. 5, the maximum values of curve A1 with respect to dashed line C1 are larger than the minimum values of curve A2 with respect to dashed line C2 at portions B1 and B2. In other words, the oscillation command generation part 23 preferably determines the oscillation amplitude so that the previous curve A1 and the succeeding curve A2 partially overlap each other. In curves A1, A2 and A3, since the feed speed is constant, the oscillation amplitude of each oscillation command is also the same.

At the overlapping portions B1 and B2, since the tool 11 separates from the workpiece W when the tool 11 is machining with the trajectory of curve A2, the workpiece W is not machined. In the present embodiment, since such overlapping portions are periodically generated, so-called intermittent cutting can be performed. Namely, in the example shown in FIG. 5, swarf is generated at each of portions B1 and B2 by the operation according to curve A2. In the second rotation curve A2, swarf is generated twice. Since such intermittent cutting is performed periodically, vibration cutting becomes possible.

Further, curve A3 formed with respect to dashed line C3 has the same shape as curve A1. Curve A2 and curve A3 overlap at portion B3 corresponding to a rotation angle of about 120 degrees and at portion B4 corresponding to a rotation angle of about 360 degrees. Swarf is generated at each of portions B3 and B4 by the operation according to curve A3. Swarf is generated twice in the third rotation curve A3. Thereafter, swarf is generated twice for each rotation of the workpiece. However, no swarf is generated in the first rotation.

By setting the oscillation frequency and the oscillation amplitude in this manner, the oscillation command generation part 23 generates the oscillation command (step S11). For example, the oscillation command for obtaining the trajectory of the tool 11, such as curves A1, A2, A3, etc., shown in FIG. 5, is represented by the following formula.

$$\text{Oscillation command} = (K \times F/2) \times \cos(2\pi \times S/60 \times I \times t) - (K \times F/2) \quad \text{Formula (1)}$$

In Formula (1), K is the oscillation amplitude magnification, F is the movement amount of the tool 11 per rotation of the workpiece W, i.e., the feed amount per rotation [mm/rev], S is the rotation speed [$\text{min}^{-1}$], or [rpm] around the center axis of workpiece W, and I is the oscillation frequency magnification. The aforementioned oscillation frequency corresponds to the expression $S/60 \times I$ in Formula (1), and the aforementioned oscillation amplitude corresponds to the expression $K \times F/2$ in Formula (1). The oscillation amplitude magnification K is an integer of 1 or more, and the oscillation frequency magnification I is a non-integer larger than zero (for example, a positive non-integer such as 0.5, 0.8, 1.2, 1.5, 1.9, 2.3, or 2.5, . . . , etc.). The oscillation amplitude magnification K and the oscillation frequency magnification I are constant (in the example of FIG. 5, I is 1.5).

The reason why the oscillation frequency magnification I is not an integer is that in the case of an oscillation frequency which is exactly the same as the number of rotations around the center axis of workpiece W, it is impossible to generate the overlapping portions B1, B2, B3, B4 and the like described above, and an effect of shredding swarf though oscillation cutting cannot be obtained.

Furthermore, according to Formula (1), the oscillation command is a command in which the expression $(K \times F/2)$ is subtracted as an offset value from the cosine waves using dashed lines C1, C2 and C3 as reference axes indicating the position command. Thus, the positional trajectory of the tool 11 based on the command value obtained by adding the oscillation command to the position command can be controlled with the position by the position command as the upper limit in the machining feed direction of the tool 11. Therefore, curves A1, A2, A3, etc., in FIG. 5 are such that the dashed lines C1, C2, C3, etc., are not exceeded in the positive Z axis direction (i.e., the machining feed direction of the tool 11).

Further, using an oscillation command as represented by Formula (1), large oscillation commands are not issued from the start in the feed direction of the tool 11 at the machining start point (0 degrees on the horizontal axis) of the tool 11, as can be seen from curve A1 in FIG. 5.

Note that, the initial value of each parameter (K and I in Formula (1)) adjusted when defining the oscillating frequency and the oscillating amplitude is stored in the host control device 30 before the machine tool 10 is operated.

The rotation speed Vc of the workpiece W is stored in advance as a machining condition in the host control device 30. The feed amount per rotation F is obtained from the rotation speed Vc and the position command generated by the host control device 30.

Then, in step S12 of FIG. 3, the position detection part T1 detects the actual position of the fees axis M1 as the detected position Pd. In step S13, the position deviation ΔP between the position command Pc and the detected position Pd is calculated. In step S14, the position deviation ΔP is added to the oscillation command to create a resultant command Sc in the first adding part 24.

Thereafter, in step S15, the normalization part 25 normalizes the resultant command Sc, which is the position deviation ΔP to which the oscillation command has been added, using a representative value. The representative value varies depending on the shape of the portion of the workpiece W to be cut. As shown in FIG. 1, when the tool 11 cuts the outer peripheral surface of the cylindrical portion W1, the representative value is the position command Pc.

As shown in FIG. 4, when the tool 11 cuts the outer peripheral surface of the tapered portion W3, the representative value may be the position command Pc, or may be the rotation speed command Vc of the spindle or the actual value of the rotation speed of the spindle. The reason for this is that though the rotation speed command Vc of the spindle, etc., are constant when cutting the cylindrical portion W1, when cutting the tapered portion W3, the rotation speed command Vc of the spindle varies in accordance with the radius of rotation of the tapered portion W3 at the cutting position.

Specifically, the rotation speed command Vc of the spindle, etc., varies so that the circumferential speed of the tapered portion W3 at the cutting position becomes constant. Therefore, as the radius of rotation of the tapered portion W3 increases, the rotation speed command Vc of the spindle, etc., becomes smaller. As shown in FIG. 2D, the same is true for the case where the inner peripheral surface of the truncated cone-shaped recess W4 is cut. Alternatively, the resultant command Sc may be normalized using both the position command Pc and the rotation speed command Vc of the spindle, etc., or using a product of the position command Pc and the rotation speed command Vc of the spindle, etc.

In one means of normalization, the resultant command Sc is divided using, for example, the position command Pc as the representative value. Alternatively, the resultant command Sc may be proportionally converted so that the root mean square thereof is 1, or may be linearly converted so that the average is 0 and the distribution becomes 1. A resultant command Sc' normalized in this way is not dependent on the unit system. The normalized resultant command Sc' is then supplied to the learning control part 26.

When there is backlash in the drive mechanism portion of the tool 11 or when the rigidity of the drive mechanism portion is low, if the control gain is set high in order to improve the responsiveness of the servo, vibration may occur and the positional accuracy of the tool 11 may not be stable. For example, even if the spindle M0 and the fees axis M1 are driven based on command values corresponding to curves A1, A2, A3, etc., the actual position of the tool 11 may not completely follow curves A1, A2, A3, etc., in some cases. In such a case, if the actual position of the tool 11 does not coincide with the command values, such as the curves A1, A2, A3 etc., at the overlapping portions B1, B2, B3, B4, etc., shown in FIG. 5, intermittent cutting will not occur and as a result, swarf cannot be satisfactorily formed.

Thus, in the present embodiment, learning control is used to improve compliance with the oscillation command, as shown in step S16 of FIG. 3. Learning control is a control method that improves compliance with a "periodic command with a predetermined repeated pattern", and the position deviation can be decreased as the cycle progresses from the first cycle to the second cycle, the second cycle to the third cycle, etc. Specifically, position deviations for a predetermined number of oscillation cycles of the workpiece W and the tool 11 are learned and set as correction amounts, thereby preventing an increase in periodic position deviation caused by the oscillation command.

As a result, the actual position of the tool 11 gradually approaches the command value curves A1, A2, A3, etc., and ultimately coincides with the command value curves A1, A2, A3, etc. In such a case, since the command value curves A1, A2, A3, etc., have overlapping portions B1, B2, B3, B4, etc., as described above, intermittent cutting can be reliably performed, and the swarf can be reliably shredded.

Furthermore, in order to make the oscillation command the learning target, the learning bandwidth depends on the oscillation frequency of the oscillation command. Learning bandwidth for learning control has an upper limit, and when the oscillation frequency exceeds the upper limit, learning does not converge and position deviation remains. As a result, swarf is not satisfactorily formed. Therefore, in the present embodiment, it is necessary to obtain an optimum oscillation frequency and oscillation amplitude within a range where learning control can be performed.

Specifically, similarly to a torque reduction method, the oscillation frequency of the oscillation command can be kept low by adjusting (lengthening) the length of the swarf, as described later, and the learning bandwidth can be accommodated. Of course, if modification of machining conditions is possible, the feeding rate may be reduced.

Furthermore, in the oscillation cutting of the present embodiment, since the optimum oscillation frequency and oscillation amplitude are obtained, the required torque can be minimized. However, if the required torque can be minimized, torque saturation can occur, which must be prevented. Further, when learning control is applied, the torque increases and torque saturation becomes more likely to occur. Thus, in the present embodiment, it is necessary to obtain an optimum oscillation frequency and oscillation amplitude within a range which will not cause torque saturation.

Specifically, the oscillation frequency of the oscillation command can be kept low by adjusting (lengthening) the length of the swarf, as described later, and the required torque can be reduced. Of course, if modification of the machining conditions is possible, the feeding rate may be reduced.

The oscillation amplitude is preferably as small as possible so that, when the oscillation frequency is low, longer swarf is formed. At such a time, the torque required for the spindle M0 and the feed axes M1, M2, etc., can be small. Conversely, when the oscillation amplitude is large, the torque required for the feed axes M1, M2, etc., also increases. When the oscillation frequency is high, the length of the swarf becomes short, and the torque required for the feed axes M1, M2, etc., also increases.

When an operator requires a desired length of swarf, the operator can enter the desired length of the swarf into the oscillation command generation part 23. As a result, the oscillation command generation part 23 generates the oscillation frequency and the oscillation amplitude based on the desired swarf length. For example, when short swarf is requested, damage to the workpiece W can be prevented, and when long swarf is requested, the load on tool 11 can be reduced by suppressing the torque and learning bandwidth, allowing for learning to more easily converge.

Referring again to FIG. 3, in step S16, the learning control part 26 carries out learning control as described above. The output from the learning control part 26 is supplied to the denormalization part 27. In step S17, the output from the learning control part 26 is denormalized in the denormalization part 27.

As a matter of course, the representative value used for denormalization is similar to the representative value used in the normalization part 25. For example, when the position command Pc is used as the representative value in the normalization part 25, the position command Pc is also used in the denormalization part 27. Similarly, when a product of the position command Pc and the rotation speed command Vc of the spindle, etc., is used as the representative value in the normalization part 25, the product of the position command Pc and the rotation speed command Vc of the spindle, etc., is also used as the representative value in the denormalization part 27.

Further, in step S18, the second adding part 28 adds the normalized output of learning control to the resultant command Sc as a correction amount. Thereafter, the position speed control part 29 generates the speed command and torque command based on the resultant command Sc" to which the normalized output has been added, and supplies the speed command and torque command to the fees axis M1. The fees axis M1 is controlled based on such a command.

Figure 6A:
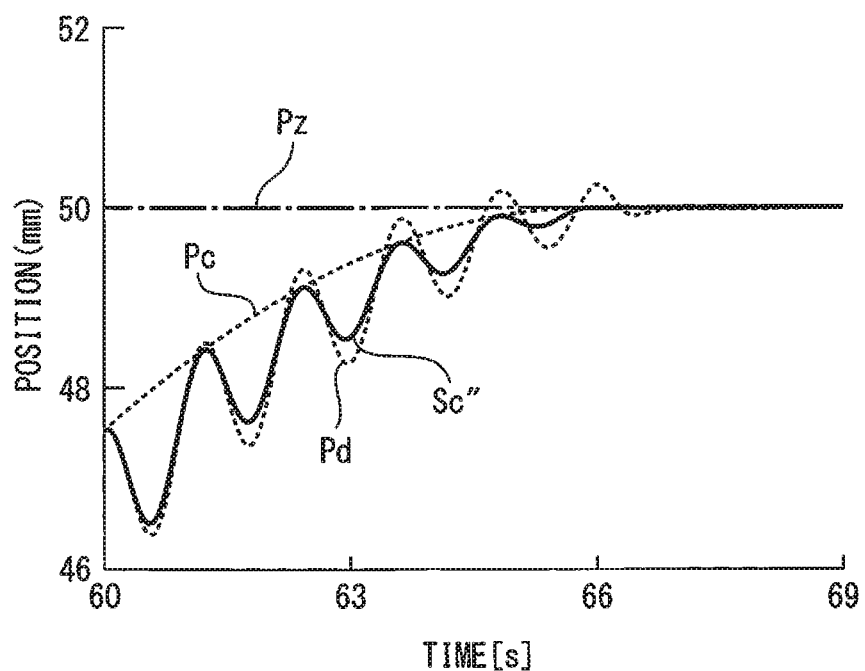
FIG. 6A is a drawing showing the relationship between time and the position of the tool in the prior art.
Figure 6B:
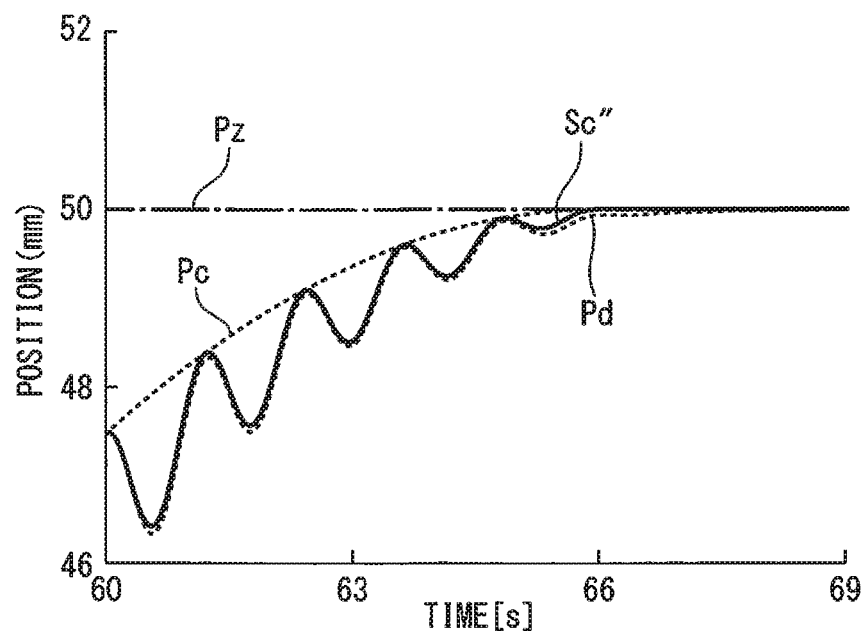
FIG. 6B is a drawing showing the relationship between time and the position of the tool in the first embodiment.

FIG. 6A and FIG. 6B are drawings showing the relationship between time and the position of the tool of the prior art and the first embodiment, respectively. In these drawings, the horizontal axis represents time (s) and the vertical axis represents the position (mm) of the tool or the fees axis M1. The vertical axis corresponds to the Z direction shown in FIGS. 1 and 4.

Furthermore, the dashed line represents the position command Pc, and the sinusoidal solid curve represents the resultant command Sc". However, the solid curve which represents the resultant command Sc" shown in FIG. 6A has not undergone processing by the normalization part 25 and by the denormalization part 27. Further, the sinusoidal dashed curve represents the detected position Pd. Note that, the prior art primarily differs from the above-described embodiment in that the normalization part 25 and denormalization part 27 are not used in the prior art.

In these drawings, a straight line representing the terminal position Pz of the cylindrical portion W1 is shown at a position of 50 mm. The terminal position Pz corresponds to the corner part Q between the cylindrical portion W1 and the flange W2.

In FIG. 6A and FIG. 6B, the resultant command Sc" is generated so as to not exceed the terminal position Pz. However, as shown in FIG. 6A, in the prior art, the curve of the detected position Pd is locally larger than the terminal position Pz. In such a case, since the tool 11 moves locally beyond the terminal position Pz, a cut will be formed in the flange W2 coupled to the cylindrical portion W1. Therefore, in the prior art, the compliance of the detected position Pd with the resultant command Sc" is low.

In the first embodiment shown in FIG. 6B, processing is performed by the normalization part 25 and the denormalization part 27. As can be understood from FIG. 6B, etc., just before the terminal position Pz, the rate of change of the position command Pc decreases gradually. In other words, just before the terminal position Pz, the value of the position command Pc when the output from the learning control part 26 is supplied to the denormalization part 27 is smaller than the value of the position command Pc when the resultant Sc" is input to the learning control part 26.

As described above, the learning control part 26 obtains and stores the correction amount, and applies the correction amount to the resultant command Sc after one oscillation period or after a predetermined number of oscillation periods. Further, in the denormalization part 27, the above-mentioned output is denormalized using the value of the position command Pc when the output (correction amount) from the learning control part 26 is supplied to the denormalization part 27.

Therefore, the output from the learning control part 26 is appropriately modified to match the value of the position command Pc when the output (correction amount) from the learning control part 26 is supplied to the denormalization part 27. As a result, even when learning is applied, compliance can be improved. Thus, as shown in FIG. 6B, the curve of the detected position Pd does not become larger than the terminal position Pz, so that it is possible to prevent a cut from being formed in the flange W2.

As explained above, when the workpiece W including a tapered portion W3 is cut, the resultant command Sc' is normalized using the position command Pc and/or the rotation speed command Vc of the spindle. Therefore, the output (correction amount) is denormalized using the value of the position command Pc and/or the rotation speed command Vc of the spindle when the output (correction amount) from the learning control part 26 is supplied to the denormalization part 27 in step S18.

As explained above, the value of the position command Pc and/or the rotation speed command Vc of the spindle when the resultant command Sc is input into the learning control part may be different than when the output from the learning control part 26 is supplied to the denormalization part 27. In the second embodiment, the output can be modified in accordance with the value of the position command Pc and/or the rotation speed Vc of the spindle when outputted from the learning control part 26, and compliance can be improved. Further, it can be understood that compliance can be further improved when normalization is performed using both the position command Pc and the rotation speed Vc of the spindle or using a product of the position command Pc and the rotation speed Vc of the spindle.

Aspects of the Present Disclosure

According to the first aspect, a control device (20) for controlling a machine tool (10), the machine tool (10) comprising a spindle (M0) for relatively rotating a workpiece (W) and a tool (11) around a center axis of the workpiece, and at least one fees axis (M1, M2) for relatively feeding the tool or the workpiece along a generatrix of an outer peripheral surface or an inner peripheral surface of the workpiece, the control device comprising a position command generation part (30) for generating a position command for the at least one fees axis based on a relative rotation speed of the workpiece and the tool and a relative feed speed of the tool and the workpiece, an oscillation command generation part (23) that generates an oscillation command for the at least one fees axis based on the rotation speed and the position command such that the tool intermittently cuts the workpiece at an oscillation frequency which is a positive non-integral multiple of the rotation speed, a first adding part (24) for generating a resultant command obtained by adding the oscillation command to a position deviation, which is a difference between the position command and an actual position of the at least one fees axis, a normalization part (25) for normalizing the resultant command, a learning control part (26) that obtains a correction amount of the resultant command based on an oscillation phase obtained from the oscillation command and a normalized resultant command and which adds the correction amount to the resultant command, a denormalization part (27) for denormalizing an output from the learning control part, and a second adding part (28) for adding an output which has been denormalized by the denormalization part to the resultant command is provided.

According to the second aspect, in the first aspect, the oscillation command generation part calculates the oscillation frequency of the oscillation command from the rotation speed and calculates the oscillation amplitude of the oscillation command from the position command.

According to the third aspect, in the first aspect, the normalization part normalizes the resultant command using at least one of the position command and the rotation speed.

According to the fourth aspect, in the third aspect, the denormalization part denormalizes the output of the learning control part using at least one of the position command and the rotation speed used by the normalization part.

According to the fifth aspect, in any of the first through fourth aspect, the oscillation command generation part generates the oscillation command by subtracting the oscillation amplitude from a reference axis of a cosine wave as an offset value.

According to the sixth aspect, in any of the first through fifth aspect, the oscillation command generation part generates an oscillation frequency of the oscillation command such that the workpiece or the tool is shifted by a half-cycle each time the workpiece or the tool makes one revolution based on the rotation speed, and generates the oscillation amplitude of the oscillation command based on the feed speed.

According to the seventh aspect, in any of the first through sixth aspect, the oscillation command generation part generates the oscillation frequency and the oscillation amplitude such that the torque of the at least one fees axis does not exceed a predetermined value.

According to the eighth aspect, in any of the first through seventh aspect, the oscillation command generation part generates the oscillation frequency and the oscillation amplitude based on a control band of the learning control part so that learning converges.

According to the ninth aspect, in any of the first through eighth aspect, the oscillation command generation part generates the oscillation frequency and the oscillation amplitude based on a desired length of swarf generated by the tool machining the workpiece.

According to the tenth aspect, in any of the first through ninth aspect, the workpiece is at least partially rotationally symmetrical and has a stepped part in a cross section along the center axis thereof.

Effects of the Aspects

In the first aspect, the resultant command is normalized using a representative value, for example, the position command and is input to the learning control part, and the output form the learning control part is denormalized using the representative value, for example, the position command. Thus, even when the representative value at the time of inputting to the learning control part is different from the representative value at the time of outputting, since the resultant command is denormalized using the representative value at the time of outputting, the change in the representative value can easily be complied with. The representative value is, for example, the position command. Therefore, even when learning control is applied, compliance can be improved.

In the second aspect, it is possible to appropriately obtain the oscillation frequency and the oscillation amplitude.

In the third aspect, when the workpiece includes a cylindrical portion, normalization can be performed using the position command. Thus, even when the position command at the time of inputting to the learning control part is different from the position command at the time of outputting from the learning control part, the output can be modified in accordance with the position command outputted from the learning control part, and compliance can be improved. Further, when the workpiece includes a conical or truncated conical portion, normalization can be performed using the position command and/or the rotation speed of the spindle. Thus, even when the position command and/or rotation speed of the spindle at the time of inputting to the learning control part is different from the position command and/or rotation speed of the spindle at the time of outputting from the learning control part, the output can be modified in accordance with the position command and/or rotation speed of the spindle outputted from the learning control part, and compliance can be improved. When normalization is performed using both the position command and the rotation speed of the spindle, compliance can be further improved.

In the fourth aspect, denormalization is performed using the same representative value as the representative value used in the normalization part, and the output from the learning control part can be appropriately denormalized.

In the tenth aspect, it is possible to prevent cuts from being formed in the workpiece.

Although the present invention has been described with reference to exemplary embodiments, a person skilled in the art would recognize that the above-described modifications of the embodiments and various other modifications, omissions, and additions can be made without departing from the scope of the present invention.

The invention claimed is:

1. A control device for controlling a machine tool, the machine tool comprising a spindle for relatively rotating a workpiece and a tool around a center axis of the workpiece, and at least one feed axis for relatively feeding the tool and the workpiece along a generatrix of an outer peripheral surface or an inner peripheral surface of the workpiece, the control device comprising:
    a position command generation part for generating a position command for the at least one feed axis based on a relative rotation speed of the workpiece and the tool and a relative feed speed of the tool and the workpiece,
    at least one position detection part for detecting an actual position of the at least one feed axis,
    an oscillation command generation part that generates an oscillation command for the at least one feed axis based on the rotation speed and the position command such that an oscillation count of the tool per rotation of the spindle becomes a positive non-integral multiple and the tool intermittently cuts the workpiece,
    a first adding part for generating a resultant command obtained by adding the oscillation command to a position deviation, which is a difference between the position command and the actual position of the at least one feed axis detected by the at least one position detection part,
    a normalization part for normalizing the resultant command with a representative value and generating a normalized resultant command which is not unit system dependent, wherein the representative value is at least one of the position command of the at least one feed axis and a rotation speed command of the spindle,
    the control device further comprising:
    a learning control part that obtains a correction amount of the resultant command based on an oscillation phase obtained from the oscillation command and the normalized resultant command and which adds the correction amount to the resultant command,
    a denormalization part for denormalizing an output from the learning control part with a representative value which is the same as the representative value used by the normalization part, and
    a second adding part for adding an output which has been denormalized by the denormalization part to the resultant command.

2. The control device according to claim 1, wherein the oscillation command generation part calculates the oscillation frequency of the oscillation command from the rotation speed and calculates an oscillation amplitude of the oscillation command from the position command.

3. The control device according to claim 2, wherein the oscillation command generation part generates the oscillation command by subtracting the oscillation amplitude from a reference axis of a cosine wave as an offset value.

4. The control device according to claim 1, wherein the oscillation command generation part generates an oscillation frequency of the oscillation command based on the rotation speed such that the workpiece or the tool is shifted by a half-cycle each time the workpiece or the tool makes one revolution, and generates the oscillation amplitude of the oscillation command based on the feed speed.

5. The control device according to claim 1, wherein the oscillation command generation part generates the oscillation frequency and the oscillation amplitude so that the torque of the at least one feed axis does not exceed a predetermined value.

6. The control device according to claim 1, wherein the oscillation command generation part generates the oscillation frequency and the oscillation amplitude based on a control band of the learning control part so that learning converges.

7. The control device according to claim 1, wherein the oscillation command generation part generates the oscillation frequency and the oscillation amplitude based on a desired length of swarf generated by the tool machining the workpiece.

8. The control device according to claim 1, wherein the workpiece is at least partially rotationally symmetrical and has a stepped part in a cross section along the center axis thereof.

* * * * *